United States Patent [19]

Kappel et al.

[11] Patent Number: 5,460,579
[45] Date of Patent: Oct. 24, 1995

[54] AUTOMATIC TRANSMISSION HAVING THREE PLANETARY GEAR SETS

[75] Inventors: Reinhard Kappel, Wolfsburg; Frank Mueller, Braunschweig, both of Germany

[73] Assignee: Volkswagen AG, Wolfsburg, Germany

[21] Appl. No.: 200,999

[22] Filed: Feb. 24, 1994

[30] Foreign Application Priority Data

Feb. 27, 1993 [DE] Germany ............... 43 06 159.1

[51] Int. Cl.$^6$ .................................................. F16H 47/08
[52] U.S. Cl. ............................................ 475/276; 475/280
[58] Field of Search ................................ 475/276, 280

[56] References Cited

U.S. PATENT DOCUMENTS 3,951,010  4/1976  Polak ........................ 475/276
3,956,946  5/1976  Murakami et al. ............. 475/280
5,277,673  1/1994  Nakayama et al. ............. 475/276

OTHER PUBLICATIONS

Korean periodical *SAE*, vol. 1, 1991, p. 285.

*Primary Examiner*—Dirk Wright
*Attorney, Agent, or Firm*—Brumbaugh, Graves, Donohue & Raymond

[57] ABSTRACT

A multispeed automatic transmission for motor vehicles has three planetary gear sets arranged in series, each having a ring gear, a planet gear support with planet gears, and a sun gear. Externally-controlled clutches and brakes are arranged to provide six forward and one reverse gear stages. To provide improved riding comfort and fuel economy, only five shifting components are required, and the construction of the transmission permits an especially short and economical structure and especially favorable planet gear speeds.

2 Claims, 3 Drawing Sheets

AUTOMATIC TRANSMISSION HAVING THREE PLANETARY GEAR SETS

BACKGROUND OF THE INVENTION

This invention relates to automatic transmissions, such as motor vehicle transmissions, having three planetary gear sets.

While conventional automatic transmissions generally have three or four gear stages, the provision of additional gear stages can improve riding comfort and reduce fuel consumption. It can be assumed that, as the number of planetary gear stages is increased, the space requirement as well as the number of planetary gear sets or planetary gear elements and the number of shifting components, such as clutches and brakes, will increase sharply. In the development of modern multispeed automatic transmissions, one objective has therefore been to further increase the number of gear stages while, at the same time, keeping the space requirement and the number of shifting components as small as possible.

An automatic transmission that attempts to meet these requirements is described in the Korean periodical *SAE*, Vol. 1, 1991, page 285. The automatic transmission represented in FIG. 10 of that publication is designed as a six-stage transmission in which three planetary gear sets are arranged one after another in series and connected to each other to provide six forward speeds and one reverse speed using five shifting components, i.e., brakes or clutches.

SUMMARY OF THE INVENTION

It is an object of the present invention to provide an improved automatic transmission having planetary gear sets which overcomes the disadvantages of the prior art.

Another object of the invention is to provide an automatic transmission which is designed so that a group shift, that is, the actuation of two shifting components during one shift operation, can be avoided.

A further object of the invention is to provide a novel transmission arrangement having lower planetary gear speeds than prior art arrangements.

These and other objects of the invention are attained by providing an automatic transmission having three planetary gear sets arranged in series wherein the ring gear of the first planetary gear set is controlled by a brake, the planet gear support of the first gear set is connected to the ring gear support of the second gear set and to the sun gear of the third gear set and is also controlled by a brake, the planet gear support of the second gear set is connected to the planet gear support of the third gear set and is also controllable by a brake, and the ring gear of the third gear set is connected to an output shaft. With this arrangement, an automatic transmission is provided which is very short in structure and can be actuated without any group shift, containing only five shifting components and, moreover, exhibiting very favorable transmission and speed ratios.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
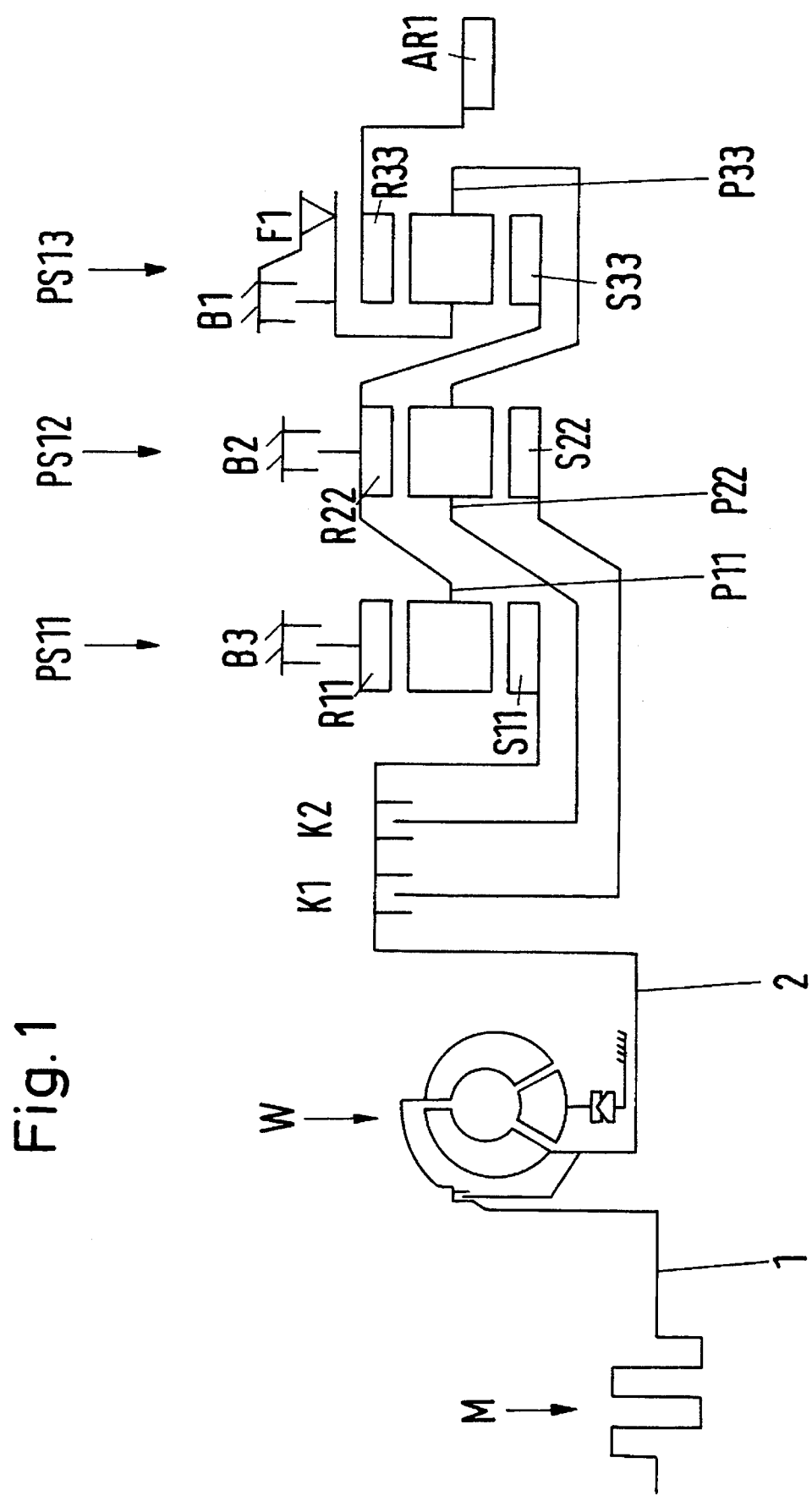
FIG. 1 is a schematic diagram illustrating a representative embodiment of an automatic transmission arranged according to the invention.

In the typical embodiment of the invention shown in FIG. 1, an engine M is arranged to drive a hydrodynamic torque converter W by way of a crankshaft 1. The turbine rotor of the converter W is connected to a transmission input shaft 2, on which two clutches K1 and K2 are mounted.

An automatic transmission to which the input shaft is connected has three planetary gear sets PS11, PS12 and PS13 arranged in sequence, each having a ring gear R11, R22 and R33, a planetary support P11, P22 and P33 for planet gears, and a sun gear S11, S22 and S33. Each of these three planetary gear sets is associated with a shifting component which, in this embodiment, takes the form of three brakes, B3, B2 and B1, respectively. The clutches K1 and K2 and the brakes B1–B3 of this transmission are electro-hydraulically actuable in the usual manner.

In accordance with this embodiment of the invention, the sun gear S11 of the first planetary gear set PS11 is connected directly to the transmission input shaft 2, whereas the sun gear S22 of the second planetary gear set PS12 can be connected to the transmission input shaft 2 only by the clutch K1. The second clutch K2 permits connection of the planetary support P22 of the second planetary gear set PS12 to the transmission input shaft, and the planetary support P22 is in turn connected to the planetary support P33 of the third planetary gear set PS13.

Another feature of the transmission illustrated in FIG. 1 is that the planetary support P11 of the first planetary gear set PS11 is connected to the ring gear R22 of the second planetary gear set PS12, that ring gear also being coupled to the sun gear S33 of the third planetary gear set PS13 and being engagable by the brake B2 to hold it in a fixed position. Moreover, the planetary support P33 of the third planetary gear set P13, which is connected in fixed relation to the planetary support P22 of the second planetary gear set PS12, can be held in fixed position by the brake B1. Further, the ring gear R11 of the first planetary gear set PS11 can be stopped by the other brake B3. Finally, the ring gear R33 of the third planetary gear set PS13 is fixedly connected to an output pinion AR1 so as to drive the transmission output.

Figure 3:
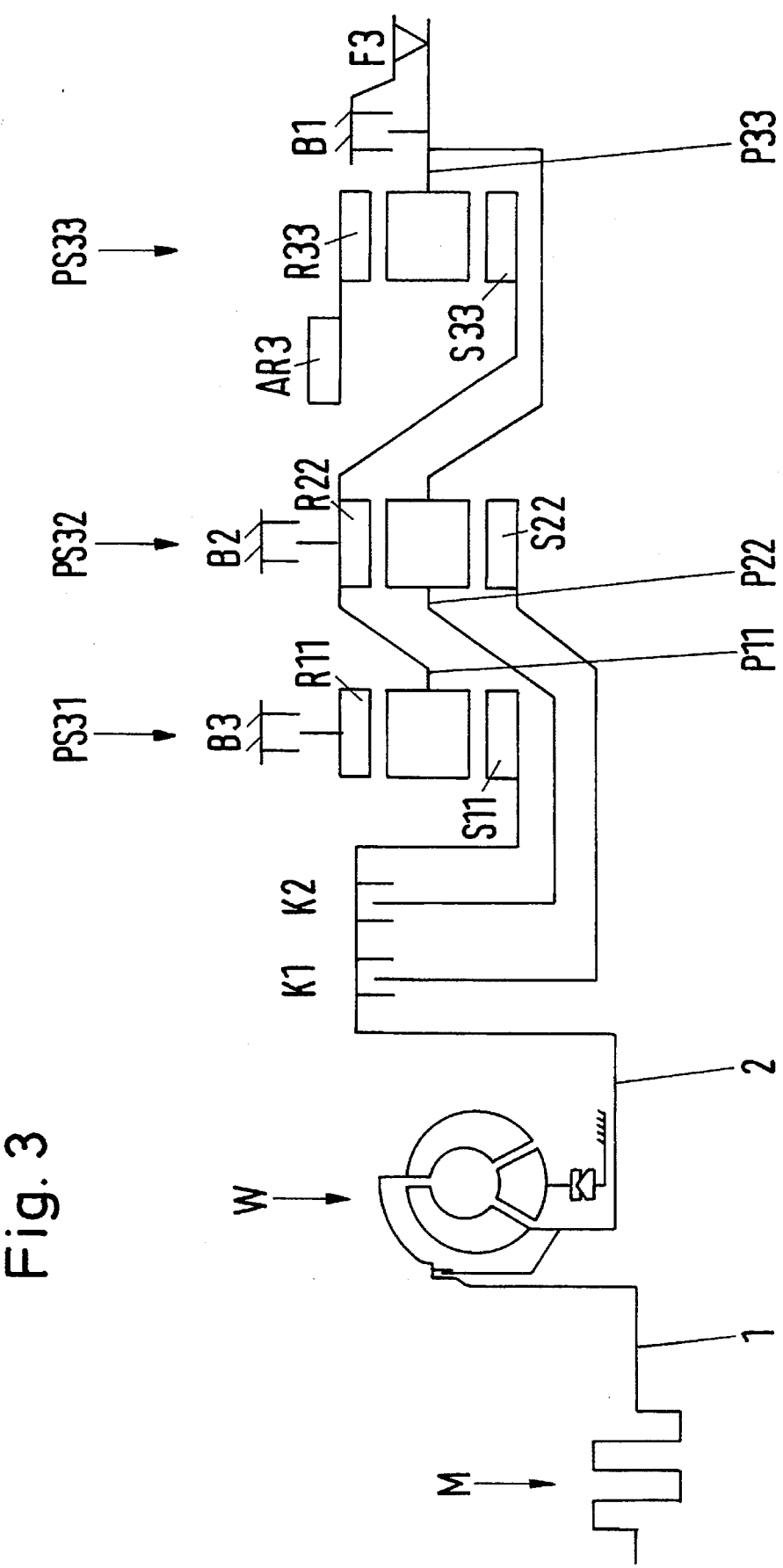
FIG. 3 is a schematic diagram illustrating a modification of the embodiment shown in FIG. 1.

In the embodiment of the invention shown in FIG. 3, the transmission is similar to that of FIG. 1. The only difference is that the ring gear R33 is connected to an output pinion AR3 which is intermediate between the planetary gear sets PS32 and PS33. This configuration of an intermediate output is advantageous for some applications, but it does have the disadvantage that the brake B1 must be positioned after the third planetary gear set PS33, which increases the space required.

The transmissions illustrated in FIGS. 1 and 3 are provided with overdrives F1 and F3, respectively, by which the planetary gear supports P33 of the third planetary gear sets PS13 and PS33, together with the planetary supports P22 of the second planetary gear sets PS12 and PS32 are held fixed in one direction.

Table 1 below indicates which of the shifting components are activated in order to actuate each of the several gear stages of the transmissions shown in FIGS. 1 and 3. In this table, "X" indicates actuation of a shifting component, i.e., one of the clutches K1 and K2, the brakes B1–B3 and the overdrive F1 and F3, and "(X)" indicates actuation only in the engine-braking mode of operation. In addition, this table shows the step-up ratio i for each of the gear stages 1–6 and reverse.

TABLE 1

| Gear Stage | Brake B1 | Brake B2 | Brake B3 | Over-drive F | Clutch K1 | Clutch K2 | Gear Ratio i |
|---|---|---|---|---|---|---|---|
| 1 | (X) | | | X | X | | 3.61 |
| 2 | | X | | | X | | 1.9 |
| 3 | | | X | | X | | 1.45 |
| 4 | | | | X | X | X | 1.0 |
| 5 | | | X | | | X | 0.744 |
| 6 | | X | X | | | X | 0.655 |
| R | X | | X | | | | −5.51 |
| N | | | | | | | — |

With this transmission arrangement, especially favorable speed ratios can be achieved for the planet gears of the three planetary gear sets. Thus, the ratio of planet gear speed to sun gear speed is 3.39 for the first planet gear set PS11, 2.22 for the second planet gear set PS12, and 1.17 for the third planet gear set PS13.

Figure 2:
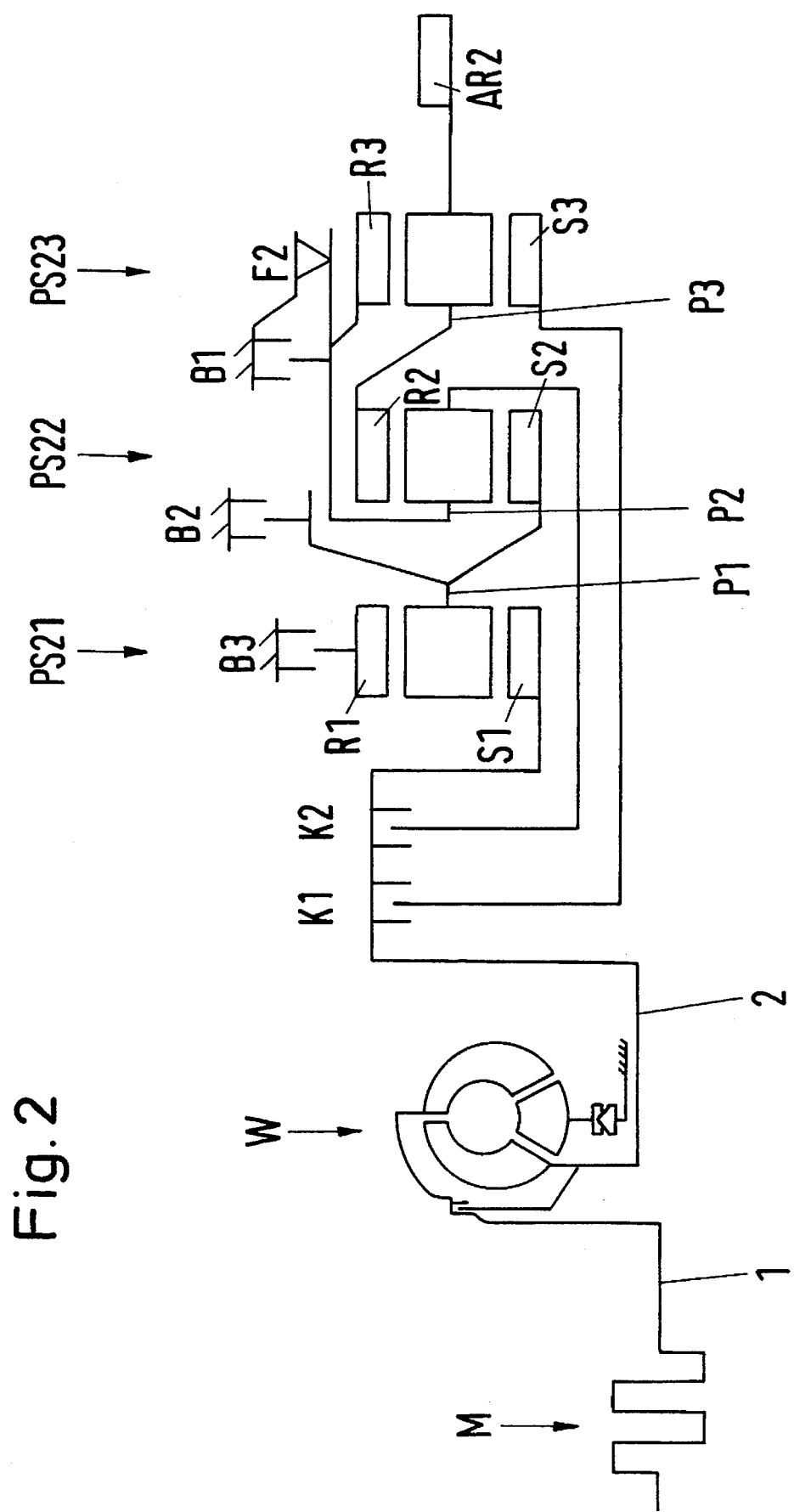
FIG. 2 is a schematic diagram illustrating another representative embodiment of the invention.

FIG. 2 illustrates a further embodiment according to the invention. As in the other embodiments, an engine M drives a hydrodynamic converter W by way of a crankshaft 1, the turbine rotor being connected to the transmission input shaft 2, and the transmission includes three planetary gear sets PS21, PS22 and PS23 arranged in sequence and connected to each other, each comprising a ring gear, a planetary support with planet gears and a sun gear.

For shifting the total of six forward gear stages and the one reverse stage, five shifting components K1, K2, B3, B2 and B1 are provided, each of which is electrohydraulically actuable. Similar to the transmissions shown in FIGS. 1 and 3, the clutches K1 and K2 are arranged on the transmission input shaft 2. In this arrangement, the sun gear S1 of the first planetary gear set PS21 is driven directly by the transmission input shaft 2, while the sun gear S3 is connectable to the transmission input shaft 2 by the clutch K1.

By actuation of the clutch K2, the planetary support P2 in the second planetary gear set PS22 is connectable to the transmission input shaft 2. This planetary support P2 is coupled to the ring gear R3 of the third planetary gear set PS23 and can also be held in fixed position by a brake B1.

Another feature of this transmission is that the planetary support P1 of the first planetary gear set PS21 is connected to the sun gear S2 of the second planetary gear set PS22 and can be held in fixed position by a brake B2. In addition, the ring gear R1 of the first planetary gear set PS21 can be held in fixed position by a brake B3.

Also, a ring gear R2 in the second planetary gear set PS22 is connected to the planetary support P3 of the third gear set PS23, the planetary support P3 being connected in driving relation to an output shaft AR2.

Finally, the planetary support P2 of the second planetary gear set PS22, which is coupled to the ring gear R3 of the third planetary gear set PS23, can be held fixed in one direction by an overdrive F2.

In contrast to the automatic transmissions shown in FIGS. 1 and 3, this transmission permits especially low planet gear speeds. For this transmission, Table 2 below indicates the shifting component engagements required for the six forward and one reverse gear stages, the "X" symbols marking activation of the shifting component, i.e., a brake, a clutch or the overdrive. Also, the transmission ratios i for the several gear stages are given.

TABLE 2

| Gear Stage | Brake B1 | Brake B2 | Brake B3 | Over-drive F2 | Clutch K1 | Clutch K2 | Gear Ratio i |
|---|---|---|---|---|---|---|---|
| 1 | (X) | | | X | X | | 3.65 |
| 2 | | X | | | X | | 1.914 |
| 3 | | | X | | X | | 1.455 |
| 4 | | | | | X | X | 1.000 |
| 5 | | | X | | | X | 0.744 |
| 6 | | X | | | | X | 0.655 |
| R | X | | X | | | | −5.51 |
| N | | | | | | | — |

As in the case of Table 1, activation of the brake B1 in the first speed is required only when the vehicle is being operated in the engine-braking (drag) mode of operation, represented by "(X)".

Similar to the transmission shown in FIG. 1, especially favorable speed ratios can be achieved with this transmission. Thus, the ratio of the planet gear speed to the drive speed, i.e., the sun gear speed, is 3.38 for the planet gears of the first gear set, 1.16 for those of the second gear set and 0.88 for those of the third gear set.

Although the invention has been described herein with reference to specific embodiments, many modifications and variations therein will readily occur to those skilled in the art. Accordingly, all such variations and modifications are included within the intended scope of the invention.

We claim:

1. An automatic transmission comprising an input shaft connected through a hydrodynamic converter to the crankshaft of an engine, an output shaft connected to an output pinion, first, second and third planetary gear sets arranged in series, each including a sun gear, a planet gear support and planet gears, and a ring gear, wherein the sun gear of the first planetary gear set is connected to the transmission input shaft, the planet gear support of the first planetary gear set is connected to the sun gear of the second planetary gear set, the planet gear support of the second planetary gear set is connected to the ring gear of the third planetary gear set, the ring gear of the second planetary gear set is connected to the planet gear support of the third planetary gear set, and the planet gear support of the third planetary gear set is connected in driving relation to an output pinion, and further comprising a first clutch for connecting the sun gear of the third planetary gear set to the transmission input shaft, a second clutch for connecting the planet gear support of the second planetary gear set to the input shaft of the transmission, a first brake for stopping the planet gear support of the first planetary gear set, a second brake for stopping the ring gear of the first planetary gear set, and a third brake for stopping the planet gear support for the second planetary gear set.

2. An automatic transmission according to claim 1 further comprising an overdrive for stopping the planet gear support of the second planetary gear set and the ring gear of the third planetary gear set.

* * * * *